(12) United States Patent
Heap et al.

(10) Patent No.: US 8,983,692 B2
(45) Date of Patent: Mar. 17, 2015

(54) EXECUTION OF HALF PLANE WITH LIMITED CHARGE CAPABILITY NEAR ZERO OUTPUT TORQUE GROWL MITIGATION STRATEGY VIA FAST ACTUATORS

(71) Applicant: GM Global Technology Operations LLC, Detroit, MI (US)

(72) Inventors: Anthony H. Heap, Ann Arbor, MI (US); Jeremy Wise, Novi, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 13/624,045

(22) Filed: Sep. 21, 2012

(65) Prior Publication Data

US 2014/0088803 A1    Mar. 27, 2014

(51) Int. Cl.
*B60W 20/00* (2006.01)
*B60W 10/06* (2006.01)
*B60W 10/08* (2006.01)
*B60W 10/04* (2006.01)

(52) U.S. Cl.
CPC ........... *B60W 20/1084* (2013.01); *B60W 20/40* (2013.01); *B60W 10/04* (2013.01)

USPC .......... 701/22; 701/54; 180/65.265

(58) Field of Classification Search
None
See application file for complete search history.

(56) References Cited

U.S. PATENT DOCUMENTS

| | | | |
|---|---|---|---|
| 2008/0004780 A1* | 1/2008 | Watanabe et al. | 701/54 |
| 2008/0023238 A1* | 1/2008 | Shimizu et al. | 903/903 |
| 2008/0257619 A1* | 10/2008 | Yamazaki | 180/65.2 |
| 2009/0018715 A1* | 1/2009 | Kanayama | 701/22 |
| 2009/0118945 A1* | 5/2009 | Heap et al. | 701/54 |
| 2010/0235027 A1* | 9/2010 | Park et al. | 701/22 |
| 2011/0165993 A1* | 7/2011 | Stoffels et al. | 477/15 |

\* cited by examiner

*Primary Examiner* — John R Olszewski
*Assistant Examiner* — David Merlino

(57) ABSTRACT

A method to control a hybrid powertrain including an engine, an electric machine, and a transmission through a transition from an initial operating point to a target operating point includes monitoring a break point in a non-convex data set defined by an engine torque below which a growl condition cannot occur and a threshold low motor torque required for the grown condition, comparing the target operating point to the break point, and controlling the powertrain based upon the target operating point and the comparing.

9 Claims, 2 Drawing Sheets

EXECUTION OF HALF PLANE WITH LIMITED CHARGE CAPABILITY NEAR ZERO OUTPUT TORQUE GROWL MITIGATION STRATEGY VIA FAST ACTUATORS

TECHNICAL FIELD

This disclosure is related to NVH issues in a hybrid drive powertrain.

BACKGROUND

The statements in this section merely provide background information related to the present disclosure. Accordingly, such statements are not intended to constitute an admission of prior art.

Powertrain systems may be configured to transmit torque originating from multiple torque-generative devices through a transmission device to an output member that may be coupled to a driveline. Such powertrain systems include hybrid powertrain systems and electric vehicle powertrain systems. Control systems for operating such powertrain systems can operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method to control a hybrid powertrain including an engine, an electric machine, and a transmission through a transition from an initial operating point to a target operating point includes monitoring a break point in a non-convex data set defined by an engine torque below which a growl condition cannot occur and a threshold low motor torque required for the grown condition, comparing the target operating point to the break point, and controlling the powertrain based upon the target operating point and the comparing.

BRIEF DESCRIPTION OF THE DRAWINGS

One or more embodiments will now be described, by way of example, with reference to the accompanying drawings, in which.

DETAILED DESCRIPTION

Figure 1:
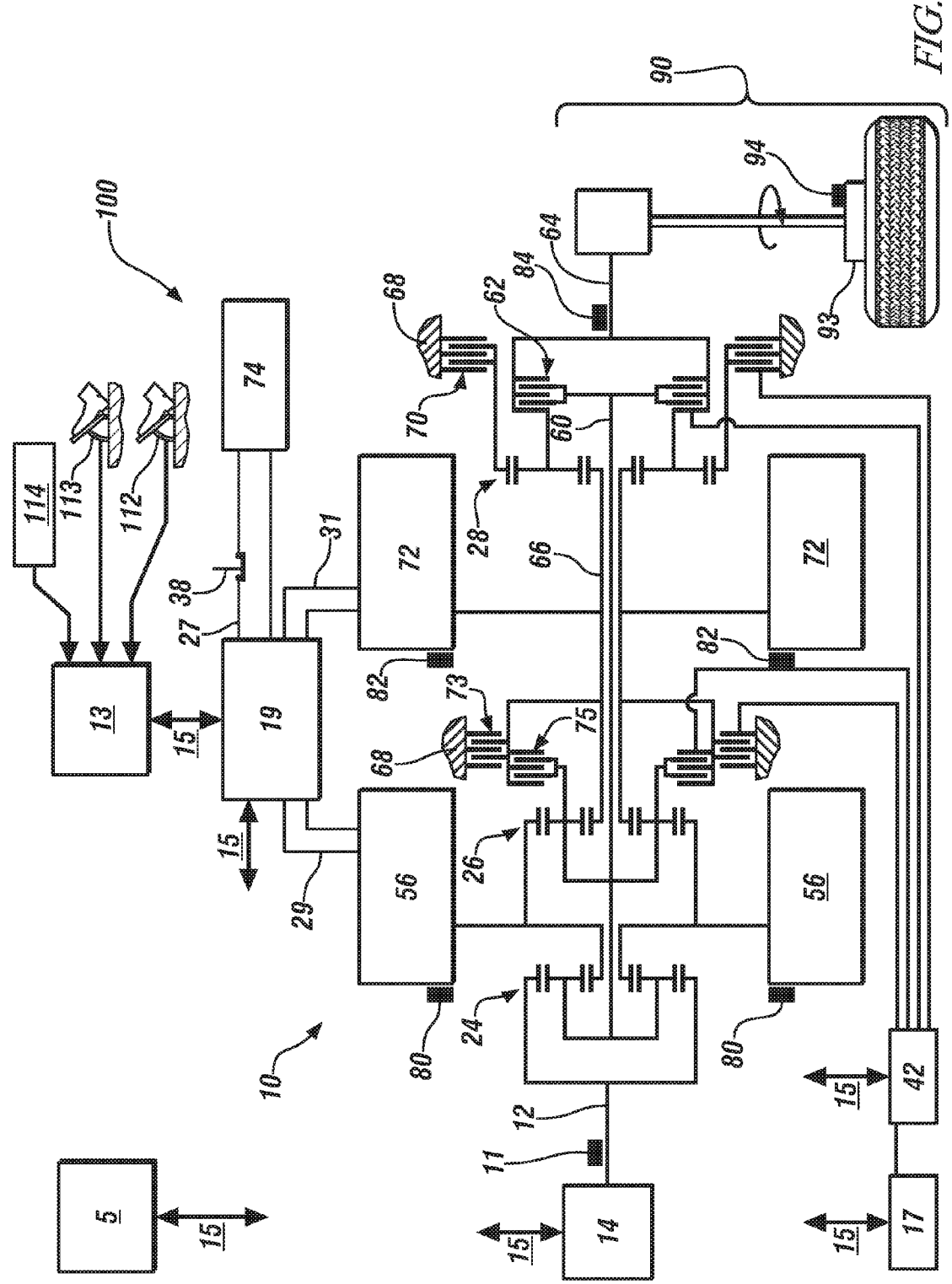
FIG. 1 illustrates a powertrain system including an internal combustion engine, a multi-mode electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain system including an internal combustion engine, a multi-mode electro-mechanical transmission, a driveline, and a controller. FIG. 1 depicts a multi-mode powertrain system 100 that includes an internal combustion engine (engine) 14, a multi-mode transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred via the transmission 10 to the driveline 90.

The engine 14 may be any suitable combustion device, and includes a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches, and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board routines, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system 100 via a communications link 15 to monitor and control operation of the powertrain system 100, including synthesizing information and inputs, and executing routines to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system 100. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system 100. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators.

Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 100 is configured to operate in one of several states that can be described in terms of engine states including one of an engine-on state (ON) and an engine-off state (OFF), and transmission ranges including fixed gear, variable (EVT), and neutral modes, set forth in Table 1.

TABLE 1

| Description | Engine State | Transmission Range | Applied Clutches |
|---|---|---|---|
| M1_Eng_Off | OFF | EVT Mode 1 | C1 70 |
| M1_Eng_On | ON | EVT Mode 1 | C1 70 |
| G1 | ON | Fixed Gear Ratio 1 | C1 70 C4 75 |
| G2 | ON | Fixed Gear Ratio 2 | C1 70 C2 62 |
| M2_Eng_Off | OFF | EVT Mode 2 | C2 62 |
| M2_Eng_On | ON | EVT Mode 2 | C2 62 |
| G3 | ON | Fixed Gear Ratio 3 | C2 62 C4 75 |
| G4 | ON | Fixed Gear Ratio 4 | C2 62 C3 73 |
| Neutral | ON/OFF | Neutral | — |

The transmission ranges set forth in Table 1 indicate the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

A hybrid powertrain such as is illustrated in FIG. 1 is a complex mechanical system. Each of the illustrated clutches includes a pair of shafts capable of transmitting reactive torque through the shaft. An engaged clutch can transmit a positive torque in a first direction or a negative torque in a second direction opposite to the first direction. A condition known as lash can occur when torque transmitted through the clutch changes from one of the directions to the other direction. Under some conditions, lash is imperceptible to occupants of the vehicle. Under other conditions, lash creates drivability issues, creating perceptible jerky acceleration of the vehicle or other driving performance degradation, or noise, vibration, and harmonics (NVH) issues. One particular type of NVH issue related to lash is known as growl. Under conditions causing growl, a perceptible rumble can be heard from the transmission. Lash can occur from a locked clutch experiencing lash. Lash can also occur in gears, planetary gear sets, and any metallic components meshed together that can experience play or have components crash together upon a reversal of torque. Methods disclosed herein are applied to conditions including a locked clutch. However, the examples provided are intended to be non-limiting examples, and similar sets of parameters enabling lash in other powertrain components can similarly be defined and controlled in accordance with the present disclosure to avoid lash and associated undesirable powertrain conditions such as growl.

Through modeling, testing, and/or calibration, conditions causing growl can be mapped and ranges of relevant values conducive to growl can be defined. In this way, growl can be reduced or eliminated by avoiding or minimizing operation in ranges conducive to growl.

In transmissions similar to the exemplary configuration of FIG. 1, growl can be identified to occur when all of the following five conditions occur simultaneously: 1) the output speed of the transmission, shaft 64 of the exemplary transmission of FIG. 1, must exist between an identified minimum output shaft speed and an identified maximum output shaft speed; 2) the engine speed must exist between an identified minimum engine speed and an identified maximum engine speed; 3) clutches must be engaged in a clutch state conducive to growl; 4) engine torque must be above a minimum engine torque conducive to growl; and 5) motor torque must fall within a threshold motor torque range, for example, as embodied by the condition TmMinGrowl<Tm<TmMaxGrowl. According to one embodiment, this range is calibrated to $-10$ Newton meters (N*m)<Tm<10 N*m. In an exemplary transmission all of these conditions must exist at the same time for growl to occur. Other conditions can be identified for other transmissions that can cause growl, and critical ranges of values conducive to growl can similarly be identified for other transmissions. The conditions conducive to growl provided herein are exemplary, and the disclosure is not intended to be limited to the particular examples provided herein.

Of the five exemplary ranges, some of the controlling parameters can be controlled for desired operation of the vehicle. For example, for a desired speed of the vehicle, the transmission and use of the electric machines of FIG. 1 can be altered to control engine speed. In this way, engine speed can be controlled based upon desired operation of the vehicle and based upon avoiding the engine speed entering the range wherein growl is possible. Similarly engine torque and motor torques can be controlled or torque contributions of each of the torque generative devices can be controlled based upon avoiding ranges wherein growl is possible. Other parameters cannot be controlled based upon avoiding growl. The output speed is directly related to the speed of the vehicle. Any scheme preventing the vehicle from going the desired speed of the operator is unlikely to be acceptable. A state of the clutches in the transmission may or may not be subject to change based upon avoiding growl.

Operating a powertrain according to a static desired condition under static conditions permits a controller of the powertrain to control contributions or operating settings of various powertrain components to avoid ranges conducive to growl. A powertrain is subject to changing operator demands and changing operating conditions. A driver can create a tip-in condition, wherein a pedal is rapidly depressed, indicating a demand for a rapid increase in requested output torque for the powertrain. A driver can create a tip-out condition, wherein a pedal is rapidly released or allowed to return to an un-depressed position, indicating a demand for a rapid decrease in requested output torque. Similarly, a road can exhibit a flat surface, an uphill surface, or a downhill surface. A static output torque through a change in road surface will change operation of the vehicle. A road surface going from level to uphill at a constant output torque will cause the vehicle to slow. The driver or an automatic system such a cruise control system may increase output torque demand either in anticipation or response to a change in road surface. Controllers for the transmission may generate a request to change gear setting based upon changing speeds or torques. Road surface can additionally bank for a turn. In addition to road surface, other operating conditions can create changes in the operation of the powertrain. A strong headwind or tailwind can change operating conditions for the vehicle. Proximity to a large truck can cause aerodynamic changes for operation of the vehicle. Slippery or wet roads can change how the vehicle operates for a given output torque or change the reactions of the driver to particular circumstances.

A change in pedal position or a change in operating conditions for the vehicle can cause transient operation of the powertrain from an initial operation to a target or desired operation. According to one method of operating a powertrain, based upon a pedal position and operating conditions for the vehicle, a target operating state for the vehicle can be estimated. This target operating state for the vehicle can be used to determine target operating values for different components of the powertrain. Changes to gear states of the transmission can be determined and scheduled. Changes to engine speed and torque and changes to motor speeds and torques can be scheduled based upon achieving the target operating state for the vehicle.

A data set can be a convex data set. In a convex data set, a line segment can be drawn between any two points in the data set, and a transition between the two points along the line never leaves the data set. Exemplary convex data sets can be circular, oval, or rectangular. A data set can be a non-convex data set. In a non-convex data set, points exist wherein a line segment drawn between the points would include a portion of the line segment outside the data set or the line segment would not be entirely contained by the data set. An exemplary non-convex data set can be shaped like a crescent. For two points, each located at a different tip of the crescent, a portion of a line segment drawn between the two points would not be contained by the crescent, but would rather traverse the hollow portion of the crescent. In a transition of a system including a transition from one point in a non-convex data set to another point in the non-convex data set, control methods need to take into account a location of an initial point and a location of a target point in order to command a desired data set conforming transition. Such a conforming transition achieves the target point without leaving the non-convex set during the transition. Control methods taking into account an initial and a target point to conform to a non-convex data set can constrain or limit parameters that control the transition to affect the desired conforming transition. Such a control method can be used to avoid an undesirable powertrain condition wherein the powertrain condition is defined by a set of required parameters, prohibited ranges for each of the required parameters, and a data set describing a boundary between two of the required parameters and a region wherein growl is possible, wherein the data set is a non-convex data set. According to one control method, information regarding the initial operating point and the target operating point can be used to segment or divide the non-convex data set into two or more convex data sets, and the plurality of convex sets can be used to control the transition within one of the convex sets and the improved simplicity of control within a convex set.

Figure 2:
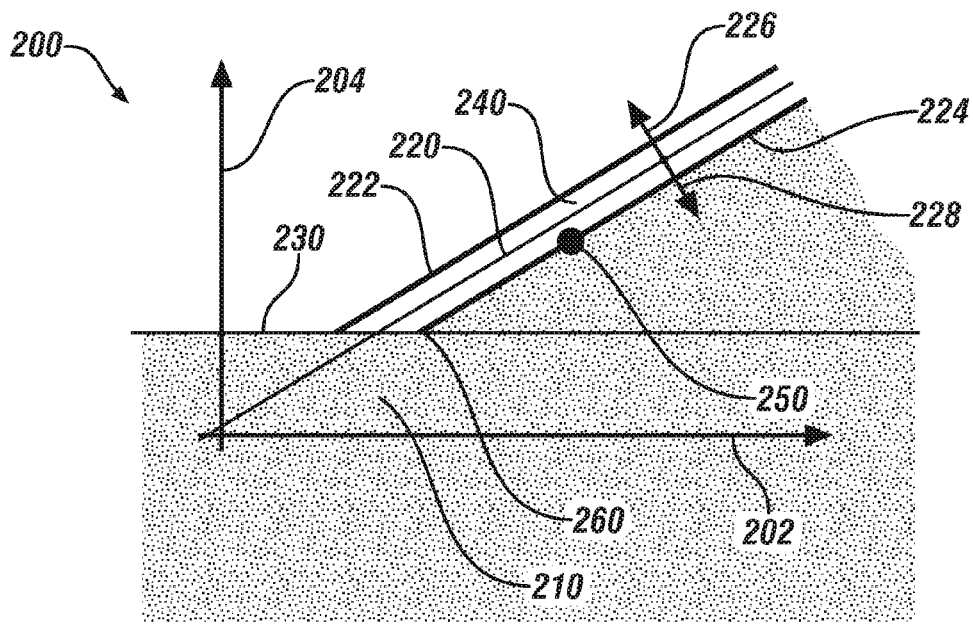
FIG. 2 illustrates data from an exemplary powertrain, illustrated upon an engine torque to output torque domain, illustrating regions wherein near zero output torque growl is possible and not possible, in accordance with the present disclosure.

FIG. 2 illustrates data from an exemplary powertrain, illustrated upon an engine torque to output torque domain, illustrating regions wherein near zero output torque growl is possible and not possible. Data plot 200 is illustrated. Horizontal axis 202 illustrates increasing output torque, and vertical axis 204 illustrates increasing engine torque. Line 220 illustrates a line wherein a reactive torque transmitted through a clutch and a corresponding motor torque for a motor transmitting torque to the clutch equals zero. Arrow 228 illustrates the motor torque increasing from the zero region. Arrow 226 illustrates the motor torque decreasing or increasing in a negative direction from the zero region. Lines 222 and 224 define a region wherein motor torque and reactive torque through the clutch are within a threshold low region or an absolute value of the torque is lower than a threshold. This region 240 defined by 222 and 224 is selected based upon growl being possible when the motor torque is below that threshold value, and region 240 illustrates operation that should be avoided to stop the occurrence of growl. According to one embodiment a value of +/−10 Newton meters from line 220 is utilized to define region 240. Line 230 illustrates a minimum engine torque at which growl can occur. Because both engine torque and motor torque must be within regions conducive to growl in order for growl to be possible, no restriction based upon motor torque is required when the operation of the engine is below the threshold engine torque defined by line 230. Shaded region 210 illustrates a half plane, assuming in this instance that an initial operating point exists wherein the motor torque is positive and outside of region 240. Shaded region 210 illustrates a non-convex data set wherein operation of the powertrain can occur without growl being possible. In the particular data set represented by shaded region 210, a break point 260 can be used to segment the non-convex data set, discriminating appropriate control commands to conform to the shaded region 210 on the basis of relation of an initial point and a target point to the break point 260. In one embodiment, a control method can be used based upon whether the initial and the target point each exist to the left or to the right of the break point, creating two control regions defined by segments of shaded region 210 to the left and right of break point 260. In the illustrated data, the non-convex data set represented by shaded region 210 has the single break point 260 defining which points can and cannot be connected by a direct line segment. In a more complex data set, wherein the region of the non-convex data set defining which points can be connected by a direct line segment and which cannot is a curved line or includes a plurality of break points, more regions can be defined within the data set or a break point within the border of the data set can be selected to define regions wherein lines representing conforming control between an initial and a target point can be defined. In the exemplary data set of FIG. 2, shaded region 210 can be segmented with a vertical line through break point 260. In more complex shapes, a diagonal line or horizontal line could be similarly selected based upon defining conforming transitions with the data set. Definition according to a half plane simplifies operation of the control method, in this example, basing the control based upon whether the initial motor torque is positive. A similar half plane with the assumption that the motor torque is initially negative could be similarly defined. If the resulting data set for the half plane corresponding to negative motor torque is a convex data set, then no break point or resulting regions of the data set need be determined If the resulting data set for the half plane corresponding to negative motor torque is a non-convex data set, then methods disclosed herein can be used to determine commands for a transition conforming to the non-convex data set. Control according to an entire plane of control can be determined The resulting data set would be complex, with regions defined based upon relation of the initial and target points to the data set. However, such a complex control plane would be unnecessarily complex. With an initial point in the shaded region 210, the half plane control illustrated by FIG. 2 and related discussion can be utilized.

Many engine reaction times tend to be relatively slow. For example, control based upon changing air throttle position and fuel flow rates can take several combustion cycles to take effect. Changing powertrain operation through normal control of the engine can be considered using slow actuators to control the powertrain. Motor reaction times are relatively much faster. Also, fast engine reactions can be affected by changing spark timing, for example, by reducing an efficiency of the work output of the cylinder, thereby quickly lowering the torque output of the engine. Changing powertrain operation through motor commands or by changing spark timing can be considered using fast actuators to control the powertrain. Exemplary initial operating point 250 is illustrated. Upon initiation of a transition of the powertrain based upon a changed input, reaction of the system can be controlled based upon an estimated target operating point for the transition. If the target point is to the right of break point 260, with both initial point 250 and the target point on the same side of break point 260, the transition can be controlled as if the points were within a convex data set, as a straight line can be drawn between any two points to the right of breakpoint 260 in the shaded region 210. If the target point is to the left of break point 260, particular reactions can be controlled in light of the non-convex data set represented by shaded region 210 and the possibility that an uncontrolled transition from the initial point 250 to the target point could cross through region 240 wherein growl is possible. A variety of controlled reactions for transitions within either region are envisioned.

Figure 3:
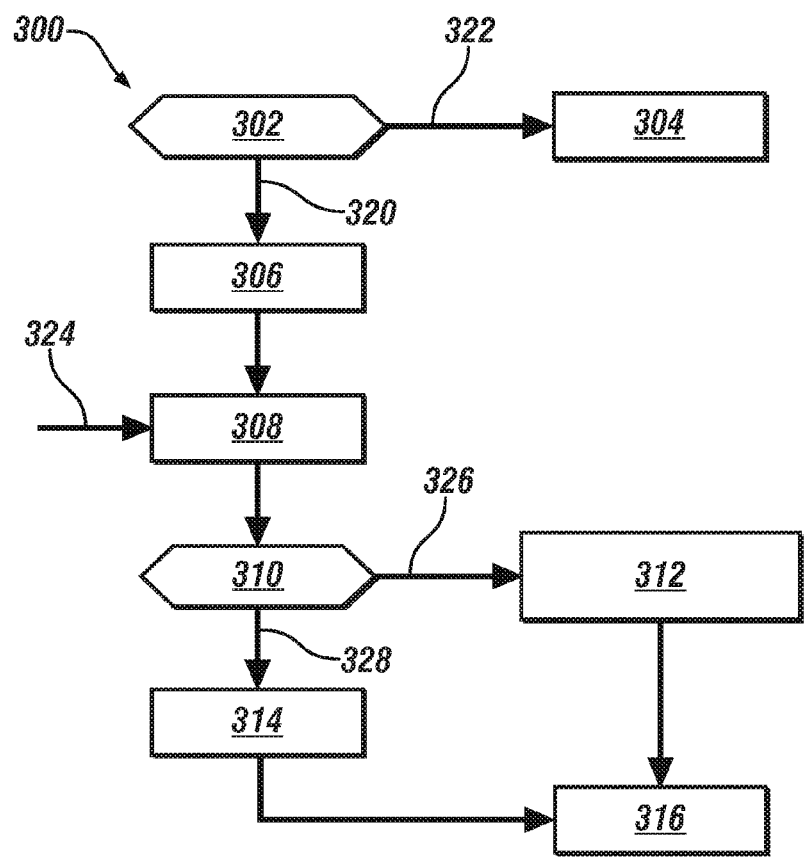
FIG. 3 illustrates an exemplary process, in accordance with the present disclosure.

FIG. 3 illustrates an exemplary process in accordance with the present disclosure. Table 1 is provided as a key to process 300 of FIG. 3, wherein the numerically labeled blocks and the corresponding functions are set forth as follows.

TABLE 2

| BLOCK | BLOCK CONTENTS |
| --- | --- |
| 302 | Given Ne, No, Clutch State, Can Growl Occur? |
| 304 | Normal Powertrain Operation |
| 306 | Calculate TeGrowlThreshold as a Function of Ne |
| 308 | Calculate To at the Corner Point |
| 310 | Is ToMinForTeConstraints > To at the Corner Point? |
| 312 | Impose Max Limit on Te<br>Set TeMax = TeGrowlThreshold<br>Leave TbMin = TbMin from MCP |
| 314 | Set TbMin = TbMinGrowl |
| 316 | Including the Previously Set Limits of the Process, Utilize Existing System Constraints Function |

Process 300 implements control according to a data set similar to the data of FIG. 2 and additionally starts with an assumption that an initial point is known to the right of a to the identified corner point as illustrated in FIG. 2. Process 300 starts at block 302 wherein engine speed Ne, output speed, No, and clutch state are examined to see if all three of these parameters are in ranges wherein growl can occur. If any of the three are not present such that growl can occur, the process follows arrow 322, and at block 304, the powertrain operates normally. If all three of the parameters are present such that, according to those parameters, growl can occur, the process follows arrow 320. At block 306, a threshold engine torque below which growl cannot occur (TeGrowlThreshold) is determined According to one embodiment, this threshold can be determined as a function of engine speed. At block 308, TeGrowlThreshold and additional variables 324 are monitored, a non-convex data set describing where growl is possible based upon engine torque, output torque, and motor torque is determined, read from memory, or otherwise accessed, a corner point in the data set is identified, and To, the torque of the output shaft of the transmission (To) at the corner point is determined At block 310, a To value for a determined target point (ToMinForTeConstraints), is compared to To at the corner point. If the ToMinForTeConstraints value is greater than To at the corner point or to the right of the corner point according to the plot of FIG. 2, the process follows arrow 328 to block 314. If ToMinForTeConstraints is not greater than To at the corner point or is to the left of the corner point according to the plot of FIG. 2, the process follows arrow 326 to block 312. In block 314, the motor torque is constrained, such that the motor torque cannot be permitted to fall within a threshold region close to a motor torque of zero. According to FIG. 2, this would constrain the motor torque such that the motor torque cannot be less than some positive calibration value (this restraint illustrated in FIG. 2 by region 240 and the associated threshold being defined by the zero motor torque line.) In certain transmission configurations such as the condition illustrated in FIG. 2, motor torque and engine torque are directly related. A single operating point on FIG. 2 defines engine torque, output torque, and motor torque. By constraining motor torque, the engine torque is also constrained to stay below line 224, line 224 acting as an upper bound on the engine torque.

As a fast actuator, the motor can quickly react to commands to remain above the threshold torque defining the threshold region and avoid the occurrence of growl. In block 312, a constraint is place upon Te, such that Te cannot exceed TeGrowlThreshold. According to one embodiment, using the spark timing of the engine as a fast actuator, the Te can be quickly controlled if is initially above TeGrowlThreshold to reach and remain below the threshold. At block 316, an exemplary method to provide control through the transition utilizes the constraints developed in either block 312 or 314. According to one embodiment, the constraints of process 300 are used to override some of the inputs used in the existing system constraints function that normally controls the powertrain through transitions. The process of FIG. 3 has an advantage of being a simple modification to the existing constraints instead of completely overriding the complex constraints calibrated to operation of the engine and requiring an entirely new set of control calculations be developed for the transition.

The data set utilized in the particular method related to growl, the motor torque and the associated minimum motor torque region, and a threshold engine torque below which growl cannot occur can be determined dynamically based upon the threshold engine torque at the time the transition is initiated and a plot of the motor torque equals zero line. Such data sets can be alternatively stored in memory or otherwise reduced to mathematical functions, such that the data sets can be recalled or created easily for immediate use upon initiation of a powertrain transition. Similarly, a data set of any powertrain parameters corresponding to an undesirable powertrain configuration defined by a set of parameters and prohibited ranges for each of the set can be generated or recalled for use in methods as disclosed herein to avoid the undesirable powertrain condition.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a hybrid powertrain comprising an engine, an electric machine, and a transmission through a transition from an initial operating point to a target operating point, wherein an undesirable condition for the powertrain is defined by a data set representing a boundary between two required parameters, wherein the data set is a non-convex data set, the method comprising:

monitoring the initial operating point;

monitoring conditions affecting operation of the powertrain;

determining the target operating point based upon the conditions;

determining a break point in the non-convex data set, wherein the break point permits the non-convex data set to be divided into a plurality of convex data sets in which the powertrain may be operated without the occurrence of the undesirable condition;

comparing the target operating point to the break point; and controlling the powertrain based upon the comparing such that the transition from the initial operating point to the target operating point occurs without falling outside the plurality of convex data sets.

2. Method to control a hybrid powertrain comprising an engine, an electric machine, and a transmission through a transition from an initial operating point to a target operating point, the method comprising:

monitoring a break point in a non-convex data set defined by an engine torque below which a growl condition cannot occur and a threshold low motor torque required for the growl condition, the break point defining a plurality of control regions which make up the non-convex data set and in which the powertrain may be operated without the occurrence of the growl condition;

comparing the target operating point to the break point; and controlling the powertrain based upon the target operating point and the comparing such that the transition from the initial operating point to the target operating point occurs without falling outside the plurality of control regions.

3. The method of claim 2, wherein controlling the powertrain comprises constraining one of torque of the electric machine and torque of the engine to keep the constrained torque out of a range conducive to the growl condition.

4. The method of claim 3, wherein controlling the powertrain further comprises controlling the powertrain according to an existing system constraint function.

5. The method of claim 2, wherein the non-convex data set is defined through a range of engine torques and a range of output torques of an output shaft of the transmission.

6. The method of claim 5, wherein comparing the target operating point to the break point comprises:

determining an output torque corresponding to the target operating point;

determining an output torque corresponding to the break point; and comparing the output torques.

7. The method of claim 6, wherein comparing the output torques comprises determining if the output torque corresponding to the target operating point is greater than the output torque corresponding to the break point.

8. The method of claim 7, wherein controlling the powertrain comprises:

constraining torque of the electric machine based upon the threshold low motor torque if the output torque corresponding to the target operating point is greater than the output torque corresponding to the break point; and constraining torque of the engine based upon the threshold low motor torque if the output torque corresponding to the target operating point is not greater than the output torque corresponding to the break point.

9. The method of claim 8, wherein the powertrain is configured such that the torque of the engine, the torque of the electric machine, and output torque of the output shaft are directly related; and wherein constraining torque of the electric machine comprises controlling the torque of the engine according to an upper bound based upon controlling the output torque of the output shaft.

* * * * *